(12) United States Patent
Jutamulia et al.

(10) Patent No.: US 11,454,751 B2
(45) Date of Patent: Sep. 27, 2022

(54) EYE WEAR VISUALLY ENHANCING LASER SPOT AND LASER LINE

(71) Applicants: Suganda Jutamulia, Berkeley, CA (US); Lequn Liu, San Jose, CA (US)

(72) Inventors: Suganda Jutamulia, Berkeley, CA (US); Lequn Liu, San Jose, CA (US)

(*) Notice: Subject to any disclaimer, the term of this patent is extended or adjusted under 35 U.S.C. 154(b) by 0 days.

(21) Appl. No.: 16/501,587

(22) Filed: May 4, 2019

(65) Prior Publication Data

US 2019/0346604 A1 Nov. 14, 2019

Related U.S. Application Data

(60) Provisional application No. 62/762,551, filed on May 9, 2018.

(51) Int. Cl.
*G02B 5/28* (2006.01)
*H04N 5/225* (2006.01)
*H04N 5/232* (2006.01)
*G02C 7/10* (2006.01)

(52) U.S. Cl.
CPC .............. *G02B 5/285* (2013.01); *G02C 7/104* (2013.01); *H04N 5/2254* (2013.01); *H04N 5/23229* (2013.01)

(58) Field of Classification Search
CPC ...... G02B 5/285; G02B 7/006; H05N 5/2254; H04N 5/23229; H04N 5/23293; H04N 5/2254; G02C 7/104; G02C 5/226; G02C 5/2263
See application file for complete search history.

(56) References Cited

U.S. PATENT DOCUMENTS

| 5,592,245 A * | 1/1997 | Moore .................... G02B 5/20 351/159.65 |
| 5,708,490 A * | 1/1998 | Wieczorek ............. A61F 9/022 2/8.1 |
| 7,118,488 B2 | 10/2006 | Chan et al. |
| 7,878,917 B2 | 2/2011 | Johnson et al. |
| 8,023,195 B2 * | 9/2011 | Alekseyev-Popov ...................... G02B 27/0172 359/630 |
| 9,829,724 B1 * | 11/2017 | Perricone ............... G02C 7/049 |
| 2005/0018131 A1 | 1/2005 | Ishak |
| 2005/0174664 A1 * | 8/2005 | Ito .......................... G02B 5/281 359/883 |
| 2015/0092053 A1 | 4/2015 | Sullivan et al. |
| 2016/0341848 A1 * | 11/2016 | Nakamura ............... G01V 8/12 |
| 2017/0374342 A1 | 12/2017 | Zhao |
| 2018/0045651 A1 * | 2/2018 | Jin ........................... G01J 3/44 |
| 2019/0025611 A1 | 1/2019 | Saylor et al. |

\* cited by examiner

*Primary Examiner* — Luong T Nguyen
(74) *Attorney, Agent, or Firm* — Suganda Jutamulia

(57) ABSTRACT

An eye wear comprises an optical filter disposed in front of an eye. The optical filter has a transmittance function of wavelength comprising a transmittance peak having a peak transmittance and a transmittance bandwidth. A transmittance outside the transmittance peak is at a lower level transmittance, wherein a ratio of the lower level transmittance to the peak transmittance is less than unity. The transmittance peak is at a central wavelength of a laser that emits laser light forming one of a laser spot and a laser line. The transmittance bandwidth is larger than a bandwidth of the laser light emitted by the laser. The laser spot or the laser line formed by the laser light emitted by the laser is viewed through the eye wear.

18 Claims, 7 Drawing Sheets

EYE WEAR VISUALLY ENHANCING LASER SPOT AND LASER LINE

CROSS-REFERENCE TO RELATED APPLICATIONS

This application claims the benefit to U.S. Provisional Application No. 62/762,551, filed May 9, 2018.

FIELD OF THE INVENTION

This invention relates to an eye wear and more specifically to an eye wear visually enhancing laser spot and laser line.

BACKGROUND OF THE INVENTION

A laser pointer has been used for pointing an object in a visual scene. For example, a laser pointer is used in a slide presentation. The presentation room is usually in low light illumination, thus the laser spot projected by the laser pointer on the screen is relatively bright and it is no problem to see the laser spot. A laser pointer either in red color or green color is also used in a gun sight system for sport, hunting, or the like. The laser spot is the position where the bullet will hit the target or a reference point for the position where the bullet will hit the target. Under bright sunshine, the laser spot may be hard to see by the naked eye.

Recently, laser line generators are commercially available. A laser line generator generates a laser line instead of a laser spot. Laser line generators may be used for leveling for hanging pictures at home. Laser line generators may be also installed in electric saw to provide a visual guide line. If the laser line generators are used in door, the laser lines are sufficiently bright to be seen by the naked eye. However, if the laser line generators are used out door under bright sunshine, it will be hard to see by the naked eye.

Laser line generators are also installed in golf putter trainers for practice as disclosed in U.S. Pat. No. 7,118,488 to Chan et al. If the putter trainer is used for in door practice, it is no problem to see the laser line. However, if the putter trainer is used in the golf course under bright sunshine, the laser line may not be easily visualized by the naked eye.

Accordingly, devices to help to visualize the projected laser spots and the generated laser lines under bright environment are demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
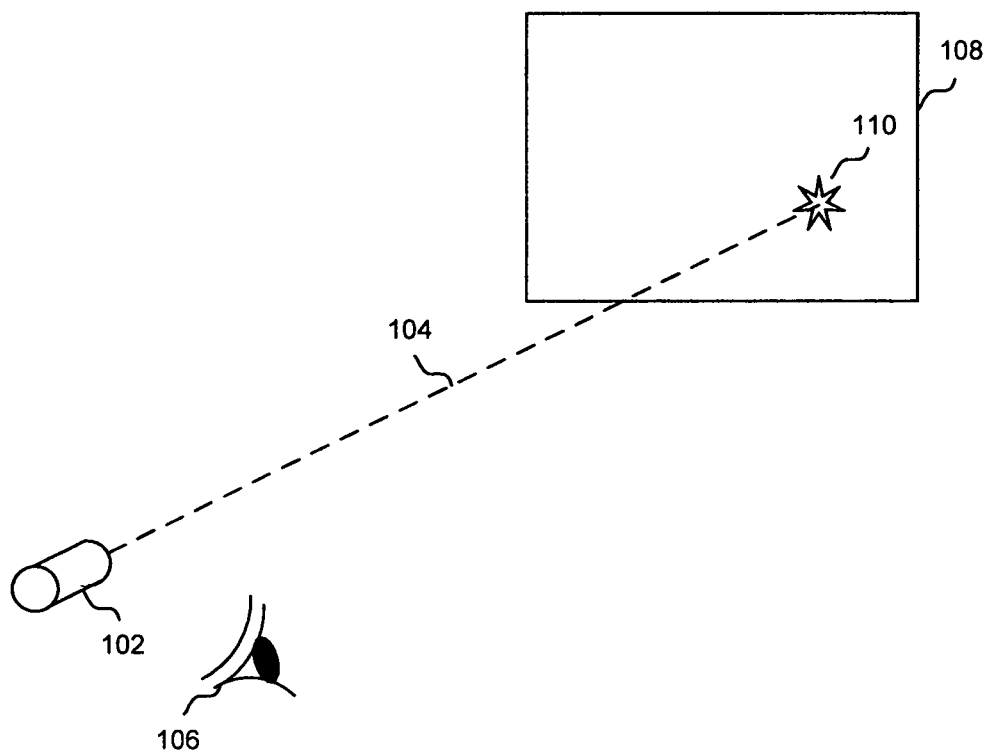
FIG. 1 schematically illustrates a laser emitting a laser light, according to an embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 schematically illustrates a laser 102 emitting a laser light 104, according to an embodiment of the invention. Laser light 104 propagates in free space having no scatterer, such as smoke and the like. An observer 106 (shown as observer's eye) cannot see the laser light 104 because laser light 104 is not scattered. Laser light 104 is incident on an object or a screen 108. The object or screen 108 scatters laser light such that observer 106 may see a projected laser spot 110.

Figure 2:
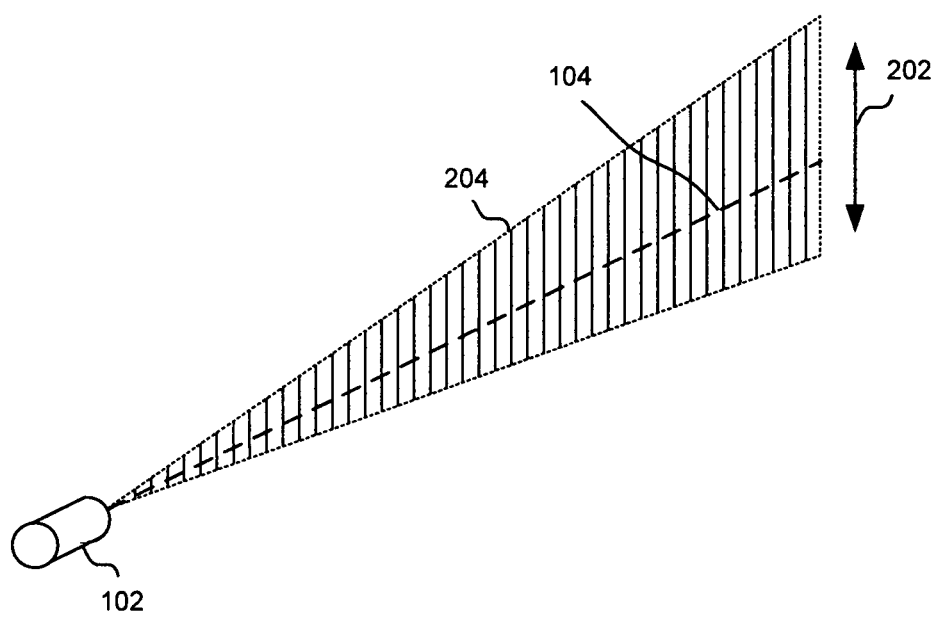
FIG. 2 schematically illustrates that laser light emitted by laser is expanded along a vertical direction, according to an embodiment of the invention.

FIG. 2 schematically illustrates that laser light 104 emitted by laser 102 is expanded along a vertical direction as shown by an arrow 202. A vertically expanded light curtain 204 is formed by optics at the exit window of laser 102 (not shown).

Figure 3:
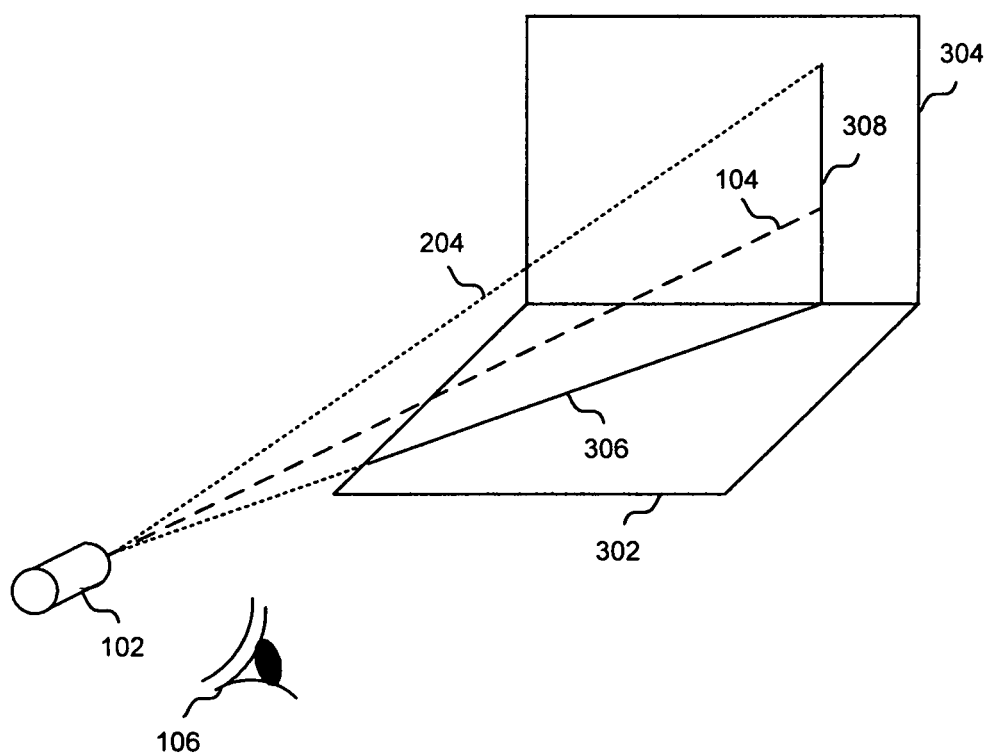
FIG. 3 schematically illustrates that a light curtain intersects a floor forming a horizontal laser line, and a wall forming a vertical laser line, according to an embodiment of the invention.

FIG. 3 schematically illustrates that light curtain 204 intersects a floor 302 forming a horizontal laser line 306. Light curtain 204 intersects a wall 304 forming a vertical laser line 308. An observer 106 (shown as observer's eye) cannot see light curtain 204, because no light is scattered, but will see laser line 306 on floor 302 and laser line 308 on wall 304. Laser line 306 is scattered by floor 302 and laser line 308 is scattered by wall 304.

In the United States, commercial products using lasers are usually regulated by the Food and Drug Agency (FDA).

Lasers used in commercial products for general public are usually regulated as Class 3R. The output power of Class 3R lasers is limited to 5 mW. Therefore, laser line generators are easily visualized in door but hard to see out door, because the power of laser may not be sufficient. A golf putter trainer can be used in door, but it may not be practiced in real golf course. A saw with a laser line may be used in door, but the laser line is hard to see when the saw is used out door.

Figure 4:
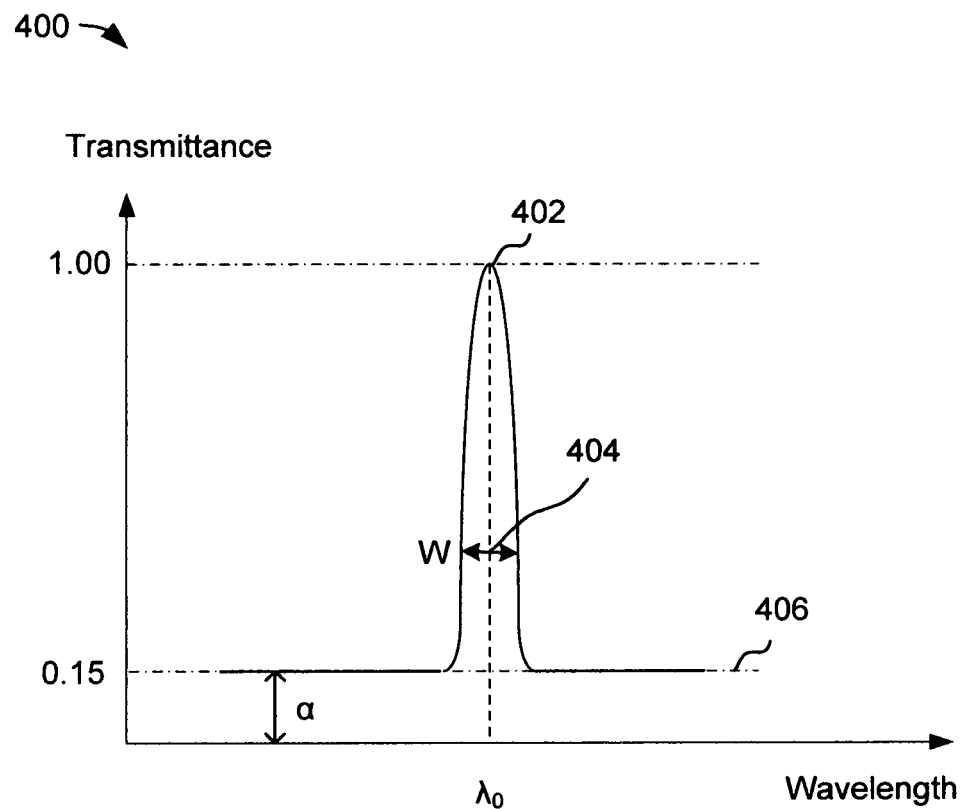
FIG. 4 schematically illustrates a transmittance function of an optical filter, according to an embodiment of the invention.

To see the laser spot or the laser line clearly out door, the out-door environment may be visually changed. FIG. 4 schematically illustrate a transmittance function of wavelength 400 of an optical filter, which is preferably a multi film interference filter, according to an embodiment of the invention. For example, transmittance function 400 has a peak transmittance of unity at a single transmittance peak 402. Transmittance peak 402 may be at a wavelength Xo. Wavelength Xo may be a central wavelength of laser light emitted by a laser. For example, the laser light may be laser light 104 emitted by laser 102. For example, may be 650 nm. The peak at wavelength Xo is sufficiently narrow. For example, a transmittance bandwidth W 402 may be 10 nm, or others, which are larger or smaller than 10 nm. For example, the transmittance bandwidth W 402 may be less than 10 nm, 20 nm, 30 nm, or 50 nm. The transmittance outside transmittance peak 402 is suppressed to a lower level 406, for example, 0.05, 0.10, 0.15, 0.20, 0.25, 0.30, or any number less than 1. In an embodiment, the transmittance function 400 may have a single transmittance peak. In another embodiment, the transmittance function 400 may have more than one transmittance peaks.

When the optical filter is placed in front of the eye or any optical system, the eye or the optical system will see a laser spot or a laser line which is brighter relative to the environment as compared with without using the optical filter in front of the eye or any optical system.

Preferably, the optical filter is a multi-film interference filter having a narrow bandwidth. If an absorption color filter using dyed or pigmented material is used, the color filter will change the color of the scene. For example, for a red laser having central wavelength at 650 nm, an absorption color filter that transmits red color, is used, the red color filter will turn the scene to red. This will make the contrast of the laser spot or the laser line to the background even worse. This is because the bandwidth of the color filter is too wide, e.g., 100 nm.

A multi film interference filter can be made having a bandwidth as narrow as 0.8 nm as used in dense wavelength division multiplexing (DWDM) in optical communications. Multi film interference filters are made by depositing alternating layers of materials with contrasting high and low indices of refraction onto a substrate. As light makes its way through the filter, part of the light reflects at each layer, resulting in interference. Depending on the thicknesses and configuration of the layers, the net result is that light of certain wavelengths is transmitted through the filter, while others are reflected off of it.

Figure 5:
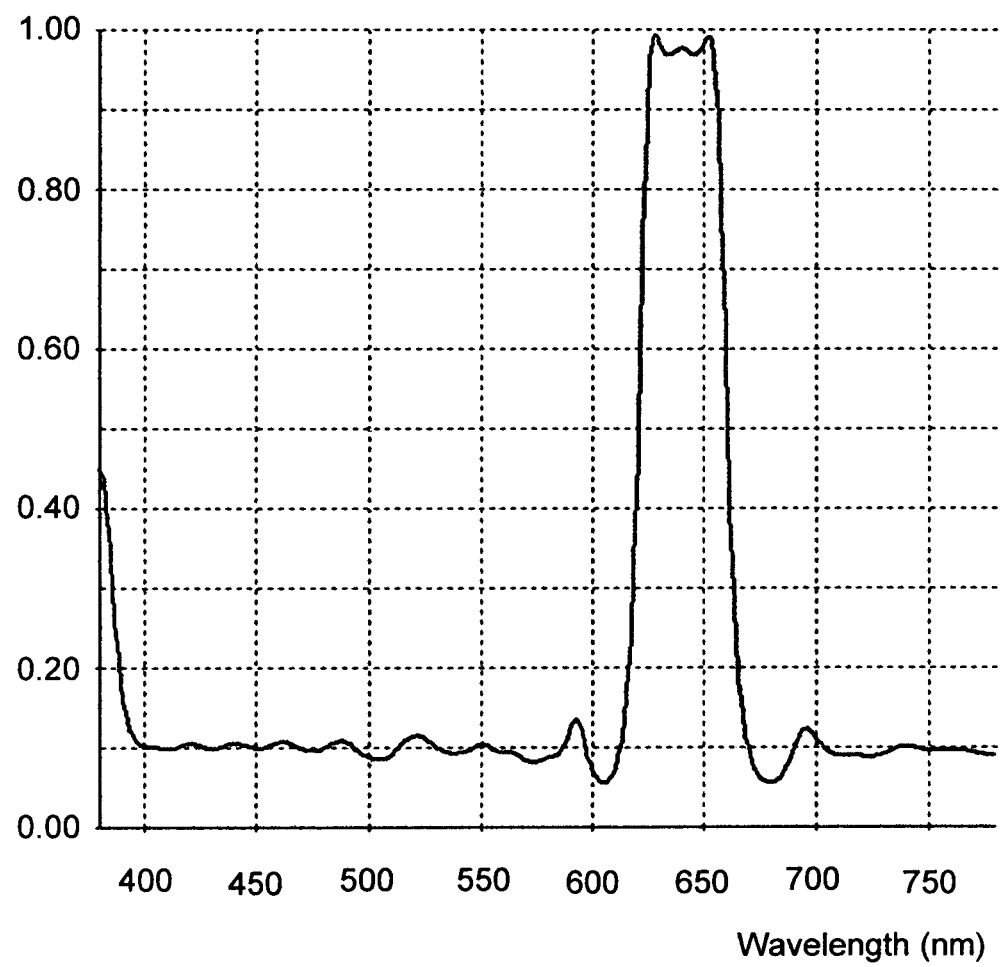
FIG. 5 schematically illustrates a transmittance function of an example optical filter, according to an embodiment of the invention.

FIG. 5 schematically illustrates a transmittance function of wavelength 500 of an example optical filter, according to an embodiment of the invention. Transmittance function 500 has a peak transmittance at 635 nm, and a transmittance bandwidth approximately 45 nm. The transmittance function 500 is computer simulated for a specially designed multi film interference filter. The thickness and refractive index of each film are determined in a design using computer.

Since the transmittance bandwidth of transmittance function 400 or 500 is sufficiently narrow, the optical filter may not change the color of the background. All wavelengths of the background are uniformly reduced. In an embodiment, the optical filter may change color content a little. In any case, the background will appear dimmer but the color content is not changed significantly.

When the optical filter is placed in front of the eye or any optical system, the intensity of the laser light is not changed because the transmittance at the laser central wavelength, e.g., 650 nm, is unity, or approximately unity. However, the intensity of the background will be reduced by a factor $\alpha$, $0<\alpha<1$. Factor $\alpha$ is the lower level 406 of FIG. 4. Thus, the laser spot or the laser line formed by the laser light will effectively visually appear enhanced while the background is suppressed.

Figure 6:
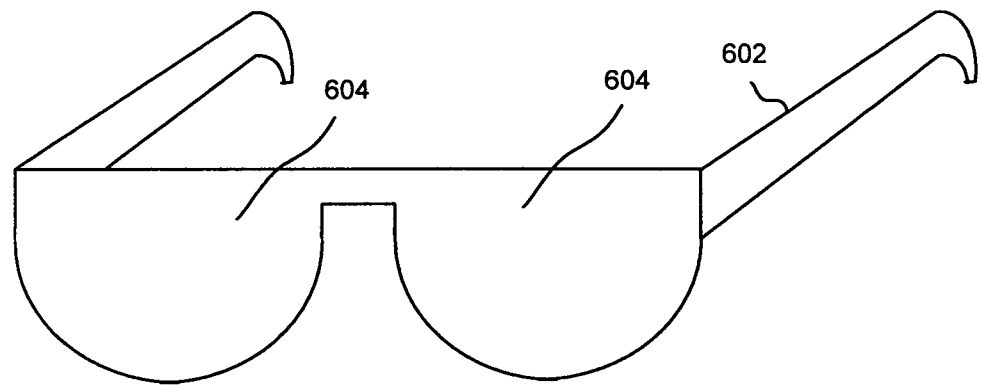
FIG. 6 schematically illustrates an eye wear having optical filter visually enhancing laser spot and laser line, according to an embodiment of the invention.

FIG. 6 schematically illustrates an exemplary eye wear 602, according to an embodiment of the invention. Eye wear 602 may be a pair of glasses, a pair of goggles, or the like. Eye wear 602 may comprise one or two optical filters 604. Optical filter 604 may comprise transmittance function 400 of FIG. 4. Optical filter 604 reduces the intensity of the background and pass the light emitted from the laser. When eye wear 602 is worn by observer 106 in FIG. 1 or FIG. 3, optical filter 604 will visually enhance the laser spot or the laser line, and suppress the back ground of other wavelengths than the laser wavelength.

Optical filter 604 has transmittance function of wavelength 400 comprising transmittance peak 402 having a unity peak transmittance, and transmittance bandwidth 404. The transmittance outside transmittance peak 402 is at lower level transmittance 406. The ratio of lower level transmittance 406 to the peak transmittance, which is unity, is less than unity. Transmittance peak 402 is at the central wavelength of a laser that emits laser light forming a laser spot or a laser line. Transmittance bandwidth 404 is larger than the bandwidth of the laser light emitted by the laser that forms a laser spot or a laser line. The bandwidth of the laser light emitted by the laser may be less than 4 nm. The formed laser spot or line is viewed through eye wear 602 by observer 106.

In some circumstances, the FDA regulation may not apply, thus the laser may have output power larger than 5 mW. In some circumstances, some gun sight systems may use lasers with output power as high as 200 mW. In these circumstances, the eye wear for visually enhance laser spot may still be useful. It will further extend the maximum effective distance of the gun sight system.

Figure 7A:
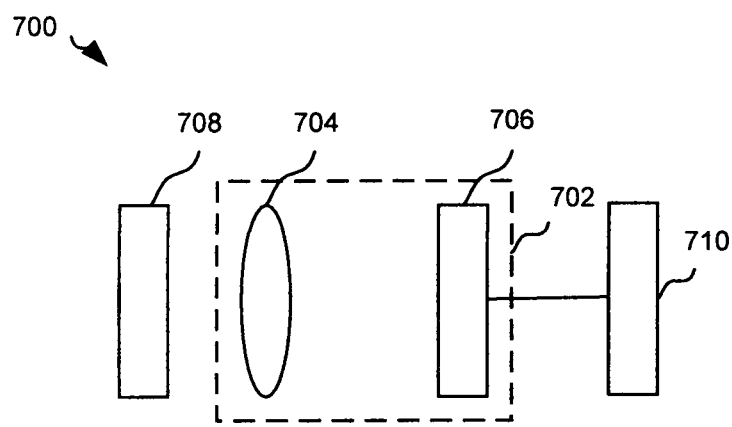
FIG. 7A and FIG. 7B schematically illustrate optical systems comprising optical filter visually enhancing laser spot and laser line, according to an embodiment of the invention, respectively.

FIG. 7A schematically illustrates an optical system 700 comprises a lens or a lens system 704, an image sensor 706, and an optical filter 708, according to an embodiment of the invention. Lens system 704 comprises at least one lens. Image sensor 706 may be a CMOS image sensor, CCD, or the like. Optical filter 708 may comprises transmittance function 400 described in FIG. 4. Lens system 704 and image sensor 706 may form a camera 702. In this manner, the laser spot or the laser line formed by the laser light emitted by the laser is viewed by the optical system and detected by the image sensor. The image detected by the image sensor may be processed by a processor 710 or a computer.

Figure 7B:
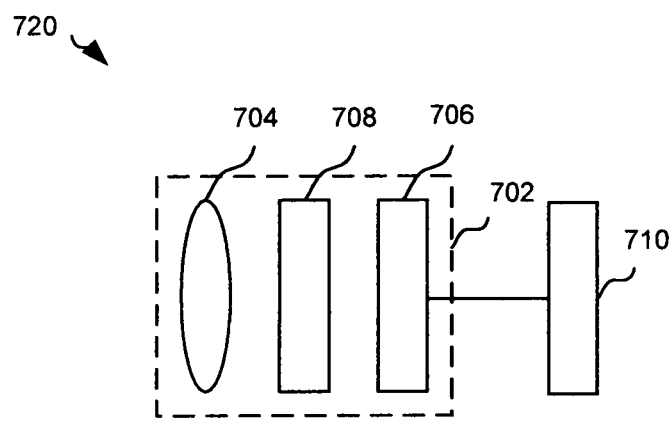

Lens system 704 is in front of image sensor 706. Optical filter 708 may be disposed in front of lens system 704. Alternatively, an optical system 720 may comprise optical filter 708 disposed between lens system 704 and image sensor 706 in camera 702, as schematically illustrated in FIG. 7B, according to an embodiment of the invention. Optical filter 708 in optical systems depicted in FIGS. 7A and 7B reduces the intensity of the background and pass the light emitted from the laser. Optical filter 708 will visually enhance the laser spot or laser line, and suppress the background.

Figure 8:
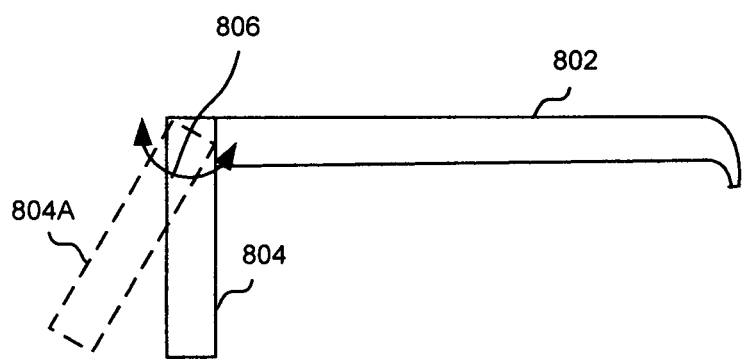
FIG. 8 schematically illustrates an eye wear having a tilted optical filter visually enhancing laser spot and laser line, according to an embodiment of the invention.

FIG. 8 schematically shows an exemplary eye wear 802, according to an embodiment of the invention. Eye wear 802 includes an optical filter 804 comprising transmittance function 400 of FIG. 4. Transmittance bandwidth W of transmittance function 400 may be close to, but larger than, the bandwidth of the laser, e.g., 2 nm. If the central wavelength $\lambda_0$ of the laser shifts, the laser light cannot transmit through optical filter 804. In order to transmit the laser light having shifted central wavelength, optical filter 804 may be tilted to a position of an optical filter 804A by a mechanical rotational arrangement 806. The tilted optical filter 804A may transmit the laser light having shifted central wavelength.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially. For the disclosed apparatuses, the order of elements may be changed while the operation principle is the same.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An eye wear comprising:
an optical filter disposed in front of an eye,
wherein the optical filter has a transmittance function of wavelength comprising a transmittance peak having a peak transmittance and a transmittance bandwidth;
wherein transmittances of wavelengths outside the transmittance peak are at a lower level transmittance, wherein a ratio of the lower level transmittance to the peak transmittance is less than unity;
wherein the wavelengths outside the transmittance peak and a wavelength of the transmittance peak are wavelengths of visible light;
wherein the wavelengths outside the transmittance peak include a first band and a second band, the first band and the second band have a transmittance between 7% and 15%;
wherein the first band comprises wavelengths shorter than the wavelength of the transmittance peak, and the second band comprises wavelengths longer than the wavelength of the transmittance peak;
wherein the transmittance peak is at a central wavelength of a laser that emits laser light forming one of a laser spot and a laser line;
wherein the transmittance bandwidth is larger than a bandwidth of the laser light emitted by the laser;
wherein one of the laser spot and the laser line formed by the laser light emitted by the laser is viewed through the eye wear.

2. The eye wear of claim 1, wherein the transmittance function comprises a single transmittance peak.

3. The eye wear of claim 1, wherein the transmittance function comprises more than one transmittance peaks.

4. The eye wear of claim 1, wherein the optical filter is a multi film filter.

5. The eye wear of claim 4, wherein the multi film filter is designed using computer.

6. The eye wear of claim 1, wherein the bandwidth of the laser light emitted by the laser is less than 4 nm.

7. The eye wear of claim 1, wherein the transmittance bandwidth is less than one of 10 nm, 20 nm, 30 nm, and 50 nm.

8. The eye wear of claim 1 further comprising a mechanical rotational arrangement for tilting the optical filter.

9. An optical system comprising:
a lens system comprising at least one lens;
an image sensor, wherein the lens system is in front of the image sensor; and
an optical filter having a transmittance function of wavelength;
the transmittance function of wavelength comprising a transmittance peak having a peak transmittance and a transmittance bandwidth;
wherein transmittances of wavelengths outside the transmittance peak are at a lower level transmittance, wherein a ratio of the lower level transmittance to the peak transmittance is less than unity;
wherein the wavelengths outside the transmittance peak and a wavelength of the transmittance peak are wavelengths of visible light;
wherein the wavelengths outside the transmittance peak include a first band and a second band, the first band and the second band have a transmittance between 7% and 15%;
wherein the first band comprises wavelengths shorter than the wavelength of the transmittance peak, and the second band comprises wavelengths longer than the wavelength of the transmittance peak;
wherein the transmittance peak is at a central wavelength of a laser that emits laser light forming one of a laser spot and a laser line;
wherein the transmittance bandwidth is larger than a bandwidth of the laser light emitted by the laser;
wherein one of the laser spot and the laser line formed by the laser light emitted by the laser is viewed by the optical system and detected by the image sensor.

10. The optical system of claim 9, wherein the optical filter is disposed in front of the lens system.

11. The optical system of claim 9, wherein the optical filter is disposed between the lens system and the image sensor.

12. The optical system of claim 9, wherein the transmittance function comprises a single transmittance peak.

13. The optical system of claim 9, wherein the transmittance function comprises more than one transmittance peaks.

14. The optical system of claim 9, wherein the optical filter is a multi film filter.

15. The optical system of claim 14, wherein the multi film filter is designed using computer.

16. The optical system of claim 9, wherein the bandwidth of the laser light emitted by the laser is less than 4 nm.

17. The optical system of claim 9, wherein the transmittance bandwidth is less than one of 10 nm, 20 nm, 30 nm, and 50 nm.

18. The optical system of claim 9 further comprising a processor for processing the image detected by the image sensor.

* * * * *